(12) United States Patent
Okayasu et al.

(10) Patent No.: US 8,246,369 B2
(45) Date of Patent: Aug. 21, 2012

(54) WATERPROOF DEVICE AND A WATERPROOF DEVICE PRODUCING METHOD

(75) Inventors: Yasushi Okayasu, Yokkaichi (JP); Yoshihiro Uchiyama, Yokkaichi (JP); Kanako Mori, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 457 days.

(21) Appl. No.: 12/563,353

(22) Filed: Sep. 21, 2009

(65) Prior Publication Data

US 2010/0075522 A1 Mar. 25, 2010

(30) Foreign Application Priority Data

Sep. 25, 2008 (JP) .................. 2008-246041

(51) Int. Cl.
*H01R 13/52* (2006.01)

(52) U.S. Cl. ......................... 439/271; 174/92

(58) Field of Classification Search .................. 439/271; 264/272.14
See application file for complete search history.

(56) References Cited

U.S. PATENT DOCUMENTS

| | | | | |
|---|---|---|---|---|
| 3,715,459 A * | 2/1973 | Hoffman | ................. | 174/138 F |
| 4,998,894 A * | 3/1991 | Gronvall | ..................... | 439/521 |
| 5,561,269 A * | 10/1996 | Robertson et al. | ............. | 174/92 |
| 5,569,882 A * | 10/1996 | Yokoyama et al. | ............. | 174/76 |
| 5,691,508 A * | 11/1997 | Radliff et al. | ................. | 174/92 |
| 6,111,201 A * | 8/2000 | Drane et al. | ................. | 174/92 |
| 6,169,250 B1 * | 1/2001 | Bolcato | ......................... | 174/92 |
| 2002/0160649 A1 | 10/2002 | Blaha | | |

FOREIGN PATENT DOCUMENTS

JP          2007-250333          9/2007

* cited by examiner

*Primary Examiner* — Michael Zarroli
(74) *Attorney, Agent, or Firm* — Gerald E. Hespos; Michael J. Porco (57) ABSTRACT

A terminal fitting (20) is provided with a terminal portion (21) and a wire connecting portion (27) formed to be continuous with the rear end of the terminal portion (21) and to be connected with an exposed part of a conductor (11). The wire connecting portion (27) and the exposed part of the conductor (11) are accommodated in a waterproof cover (40) and clearances in the waterproof cover (40) are filled with a filling material (55). The waterproof cover (40) is formed with a holding portion (51) for holding the terminal fitting (20) in such a manner as to preventing a movement of the terminal fitting (20) with respect to the waterproof cover (40) by coming into contact with the terminal fitting (20).

19 Claims, 10 Drawing Sheets

WATERPROOF DEVICE AND A WATERPROOF DEVICE PRODUCING METHOD

BACKGROUND OF THE INVENTION

1. File of the Invention

The invention relates to a waterproof device and a waterproof device producing method.

2. Description of the Related Art

Japanese Unexamined Patent Publication No. 2007-250333 discloses a waterproof device for waterproofing connected parts of a terminal fitting and a wire. The terminal fitting has a front end configured to connect with a mating side and a rear end defines a wire connecting portion in the form of an open barrel. The wire has a conductor and an insulation coating that surround the conductor. A portion of the insulation coating at the end of the wire is removed to expose the conductor. The exposed conductor then is placed on the wire connecting portion of the terminal fitting, and the barrel is crimped into connection with the exposed conductor. The waterproof device includes a box-shaped main body and a lid for partly closing an opening of the main body. The wire connecting portion of the terminal fitting and the front part of the wire are accommodated in the waterproof cover. Clearances in the waterproof cover then are filled with a filling material that surrounds the connected parts of the wire connecting portion and the conductor in a watertight manner. The waterproof cover then is heated to cure the filling material. Any moisture that is mixed in the filling material vaporizes in the heating process, thereby generating bubbles caused by steam in the filling material. These bubbles expand as the heating proceeds. The bubble generation and expansion causes the filling material to exert a pressing force on the terminal fitting. The acting position, direction and magnitude of this pressing force are unspecified. Thus, the terminal fitting can displace and incline to an improper posture with respect to the waterproof cover.

The invention was developed in view of the above situation and an object thereof is to prevent changes in the posture and posture of a terminal fitting particularly due to a process of heating a filling material in a fluid- or waterproof cover.

SUMMARY OF THE INVENTION

The invention relates to a fluid- or waterproof device for fluid- or waterproofing connected parts of a wire and a terminal fitting. The device has a fluid- or waterproof cover into which a wire connecting portion of the terminal fitting and a part of the wire are to be accommodated. The wire connecting portion being is continuous with a terminal portion to be connected with a connection object. Clearances in the fluid- or waterproof cover are at least partly filled with a filling material. The fluid- or waterproof cover is formed with at least one holding portion for contacting the terminal fitting and holding the terminal fitting in such a manner to prevent a movement of the terminal fitting with respect to the fluid- or waterproof cover.

The filling material may exert a pressing force on the terminal fitting e.g. during a heating process of the filling material. However, the contact action of the holding portion on the terminal fitting prevents the terminal fitting from moving with respect to the fluid- or waterproof cover. Thus, there is no likelihood of displacing or inclining the terminal fitting with respect to the fluid- or waterproof cover.

The waterproof cover preferably is formed with at least one confirmation opening substantially corresponding to a front end portion of the wire projecting forward from the wire connecting portion.

The holding portion preferably projects from the wall of the waterproof cover that has the confirmation opening and is arranged behind the confirmation opening. Thus, whether the front end surface of the conductor is covered properly by the filling material can be confirmed visually through the confirmation opening.

The terminal portion preferably comprises a positioning portion that is positioned by coming into surface contact with a front wall of the waterproof cover. Additionally, the holding portion preferably contacts a front end portion of the wire connecting portion in a direction substantially parallel to the front wall.

A contact position of the holding portion with the wire connecting portion preferably is close to the front end of the wire connecting portion.

The positioning portion preferably is at a rear end of the terminal portion.

The terminal fitting may try to incline its posture about its contact position with the holding portion. However, the positioning portion is displaced substantially in parallel with the front wall while being inclined with respect to the front wall. An angle of inclination of the positioning portion at this time is larger as a distance between the front wall and the holding portion is shorter. Friction between the positioning portion and the front wall becomes larger as the positioning portion inclines more. Thus, an effect of suppressing the displacement of the positioning portion increases and, consequently an effect of suppressing the inclination of the terminal fitting is improved. Accordingly, the holding portion is held in contact with the wire connecting portion at a position close to the front end of the wire connecting portion for maximally shortening the distance between the front wall and the holding portion. Therefore, the inclination of the terminal fitting can be prevented more effectively.

An injection opening preferably is formed in a wall of the waterproof cover and is used to inject the filling material into the waterproof cover. The holding portion preferably projects from the wall with the injection opening.

The holding portion preferably includes a plurality of projections that contact the wire connecting portion at a plurality of laterally spaced positions. Thus, a lateral inclination of the terminal fitting is prevented reliably.

A space enclosed by the projections and the outer surface of the wire connecting portion preferably defines a flow path for permitting the flow of the filling material substantially in forward and backward directions. Further, the filling material injected through the injection opening smoothly spreads in both spaces before and after the holding portion by passing the flow path.

The wire connecting portion preferably has at least two lateral crimping pieces that stand up from a base plate and a conductor of the wire is surrounded at least partly by the base plate and the crimping pieces. The crimping pieces are curved inwardly and their standing end edges bite in or engage the outer circumferential surface of the conductor when the conductor is connected with the wire connecting portion. Thus a valley is formed in the upper surface of the wire connecting portion and extends in substantially forward and backward directions.

The holding portion preferably is formed with at least one fitting portion to be fit at least partly into the valley to prevent a lateral displacement of the terminal fitting.

At least one receiving portion preferably is formed on the inner surface of the waterproof cover. The wire connecting portion is sandwiched and positioned reliably between the holding portion and the receiving portion.

The invention also relates to a method for producing a fluid- or waterproof device, in particular according to the invention or a preferred embodiment thereof, for fluid- or waterproofing connected parts of a conductor of a wire and a wire connecting portion of a terminal fitting by at least partly accommodating the connected parts in a fluid- or waterproof cover and at least partly injecting a filling material into the fluid- or waterproof cover, comprising the steps of: at least partly accommodating the connected conductor and wire connecting portion in a main body of the fluid- or waterproof cover, injecting a part of the filling material into the main body, mounting a lid in an opening of the main body to bring at least one holding portion of the lid into contact with the terminal fitting in such a manner as to prevent a movement of the terminal fitting with respect to the fluid- or waterproof cover, and injecting the remainder of the filling material into the main body.

Since the holding portion is so located as to at least partly partition the space between the terminal fitting and the waterproof cover, it may hinder the flow of the filling material injected into the waterproof cover. In this respect, since a part of the filling material is injected into the main body before the holding portion is brought into contact with the terminal fitting, the influence of the holding portion on the flow of the filling material can be suppressed low.

Preferably, the method further comprises a step of injecting a part of the filling material onto the bottom surface of the main body before the connected conductor and wire connecting portion are at least partly accommodated into the main body.

Since a part of the filling material is injected onto the bottom surface of the main body before the wire connecting portion and the conductor are accommodated into the main body, the filling material can be reliably filled between the bottom surface of the main body and the lower surface of the wire connecting portion.

Preferably, the method further comprises a step of detecting a filled state of the filling material through at least one confirmation opening formed in the waterproof cover substantially corresponding to a front end portion of the wire projecting forward from the wire connecting portion, wherein the holding portion preferably projects from a wall portion formed with the confirmation opening out of wall portions constituting the waterproof cover and is arranged behind the confirmation opening.

Preferably, the method further comprises a step of positioning a positioning portion of the terminal portion by bringing it into surface contact with a front wall of the waterproof cover, wherein the holding portion comes into contact with a front end portion of the wire connecting portion in a direction substantially parallel to the front wall.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

A first embodiment of the invention is described with reference to FIGS. 1 to 11. A waterproof device A of this embodiment is designed to accommodate connected parts of a front end portion of a wire 10 and a wire connecting portion 27 of a terminal fitting 20 in a sealed waterproof cover 40 and to accommodate a filling material 55 into the waterproof cover 40, thereby waterproofing the connected parts of the wire 10 and the terminal fitting 20.

A known resin such as an epoxy resin or a silicone resin can be used as the filling material 55. The filling material 55 is a low viscosity fluid upon injection into the cover 40, but is cured by a heating after the injection.

The wire 10 includes a conductor 11 formed by twisting thin metal wires and an insulation coating 12 covering the conductor 11. A specified length of the insulation coating 12 is removed at a front end of the wire 10.

The terminal fitting 20 is formed by bending, folding and/or embossing a conductive metal plate material punched or cut out into a specified shape. A terminal portion 21 is formed at the front end of the terminal fitting 20 and functions as connection means with a mating terminal (not shown) and a wire connecting portion 27 is formed at the rear end of the terminal fitting 20 and functions as connection means with the wire 10.

The terminal portion 21 includes a substantially plate-like connecting portion 22 that inclines back. A positioning portion 23 is substantially continuous with the rear end of the plate-like connecting portion 22 and a coupling 24 couples the positioning portion 23 and the wire connecting portion 27. The plate-like connecting portion 22 is substantially flat and is formed with a vertically penetrating through hole 25. The plate-like connecting portion 22 is to be placed on the mating terminal and a fixing member such as a bolt (not shown) is inserted through the through hole 25 and is screwed into the mating terminal. Thus, the terminal fitting 20 and the mating terminal are connected electrically. The positioning portion 23 is a substantially flat plate that extends substantially perpendicularly down from the rear end of the plate-like connecting portion 22. Two locking projections 26 are formed at upper parts of opposite left and right edges of the positioning portion 23 and hence at locations near the positioning portion 23. The coupling 24 is a short rib that extends substantially perpendicularly back from the end of the positioning portion 23 substantially opposite to the connecting portion 22.

The wire connecting portion 27 is an open barrel that includes a bottom plate 28 and two substantially laterally symmetrical crimping pieces 29 that project up from the opposite left and right edges of the bottom plate 28. However, the wire connecting portion 27 may be formed into cross barrels (not shown) where the barrels are offset with respect to each other in forward and backward directions and the lateral edges of the crimping pieces substantially facing each other are inclined with respect to each other so that edges of the crimping pieces cross each other after crimping. Moreover, means for connecting to the wire other than crimping means may be provided, such as soldering, insulation displacement, connecting members etc.

The front end of the bottom plate 28 is continuous with the coupling 24. The wire connecting portion 27 is crimped, bent or folded into electrical connection with the conductor 11 of the wire 10. More particularly, the conductor 11 is placed on the bottom plate 28 and the crimping pieces 29 are crimped, bent or folded and deformed inwardly so that the conductor 11 is at least partly surrounded by the bottom plate 28 and the crimping pieces 29. At this time, the standing end edges of the crimping pieces 29 bite in the conductor 11 from above and a valley 30 is formed in the upper surface of the wire connecting portion 27 by this biting of the crimping pieces 29 (see FIG. 2). This valley 30 extends in substantially forward and backward directions and is substantially parallel to a longitudinal direction of the conductor 11 substantially continuously over the entire length of the wire connecting portion 27.

In the connected or crimped state, the lower surface of the bottom plate 28 is slightly higher than the lower surface of the coupling 24 and the upper end of the wire connecting portion 27 is lower than both the upper end of the positioning portion 23 and the lower end of the plate-like connecting portion 22. The front end of the conductor 11 projects slightly forward from the front end of the wire connecting portion 27, and a space is formed between the front end of the conductor 11 and the positioning portion 23. This space is open toward the upper, left and right sides. A part of the wire 10 covered by the insulation coating 12 is drawn out substantially coaxially backward from the wire connecting portion 27. The upper end of the insulation coating 12 is slightly higher than the upper end of the wire connecting portion 27 and slightly lower than the upper end of the positioning portion 23.

The waterproof cover 40 is made e.g. of synthetic resin and includes a substantially box-shaped main body 41 with a substantially rectangular upper opening, a lid 42 mountable at the upper opening of the main body 41. At least one hinge 43 unitarily couples the upper end edge of the right wall of the main body 41 and the right edge of the lid 42. The lid 42 can be pivoted between an open position (see FIGS. 4 to 10) retracted laterally of the main body 41 and a closing position (see FIGS. 1 to 3 and 11) partly closing the opening of the main body 41 by bending the hinge 43 along a fold line extending in substantially forward and backward directions and substantially parallel to the upper end edge of the right wall of the main body 41. The lid 42 has a lock arm 44 that engages a lock projection 45 on the left outer surface of the main body 41 when the lid 42 is displaced to the closing position to lock the lid 42 at the closing position. The closed lid 42 constitutes the upper wall of the waterproof cover 40.

Two locking grooves 46 are formed by cutting off upper end parts of the front ends of the opposite left and right walls of the main body 41. The front surfaces of the locking grooves 46 are substantially flush with the inner surface of a front wall 41F of the main body 41. The locking projections 26 of the terminal fitting 20 are fit into the locking grooves 46 from above for engagement (see e.g. FIG. 3). The positioning portion 23 of the terminal fitting 20 is held in surface contact with the front wall 41F from behind and the locking projections 26 engage with the locking grooves 46 when the lid 42 is displaced to the closed position. Thus, the positioning portion 23 is positioned in forward and backward directions with respect to the front wall 41F. Further, the contact of the opposite left and right edges of the positioning portion 23 with the left and right walls of the main body 41 position the positioning portion 23 laterally with respect to the main body 41.

A slot 47 is formed in the rear wall of the main body 41 through which the wire 10 is to be drawn out of the main body 41. On the other hand, a pressing portion 48 is formed at the rear end of the inner surface of the lid 42 in a position corresponding to the slot 47. The wire 10 fits in the slot 47 when the wire connecting portion 27 and the conductor 11 are accommodated in the main body 41. The pressing portion 48 then presses the wire 10 from above when the lid 42 is displaced to the closed position. Thus, the wire 10 cannot displace with respect to the main body 41 and the lid 42 in vertical and lateral directions. Further, clearances between the rear wall and the wire 10 and between the wire 10 and the lid 42 are closed. Hence, the filling material 55 injected into the waterproof cover 40 will not flow along the outer circumferential surface of the wire 10 to leak out to the back side of the waterproof cover 40.

The lid 42 is a substantially rectangular plate and when closed corresponds to more than about half area (e.g. to an about ⅔ area) of the opening in the upper surface of the main body 41 at the rear. A conformation opening 49 is formed in an area of the opening of the main body 41 before the lid 42 when the lid 42 is displaced to the closed position and defines less than about half area (e.g. an about ⅓ area) of the opening of the main body 41 at the front. The confirmation opening 49 functions as an entrance for injecting the filling material 55 into the waterproof cover 40 and as a window hole for permitting a filled state of the filling material 55 for the front end portion of the conductor 11 to be detected (e.g. visually confirmed) obliquely from a front-upper side, for example, during the production process of the waterproof device A. The confirmation opening 49 also functions as a draw-out opening for permitting the terminal portion 21 to be drawn out of the waterproof cover 40.

Figure 2:
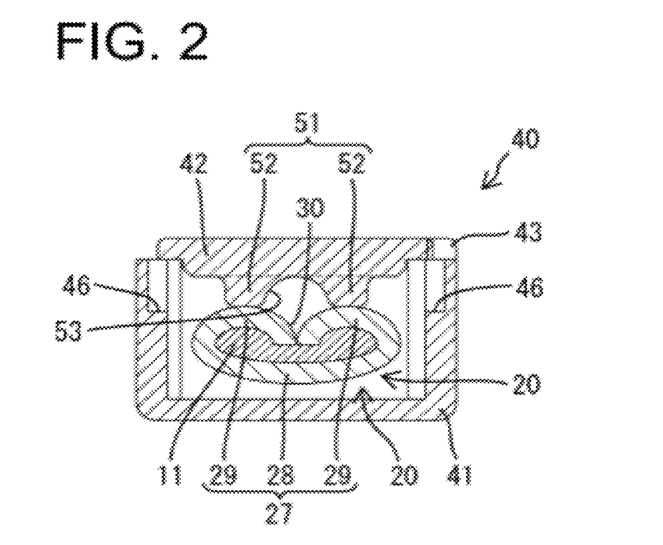
FIG. 2 is a lateral section of the first embodiment without any graphical representation of a filling material.
Figure 3:
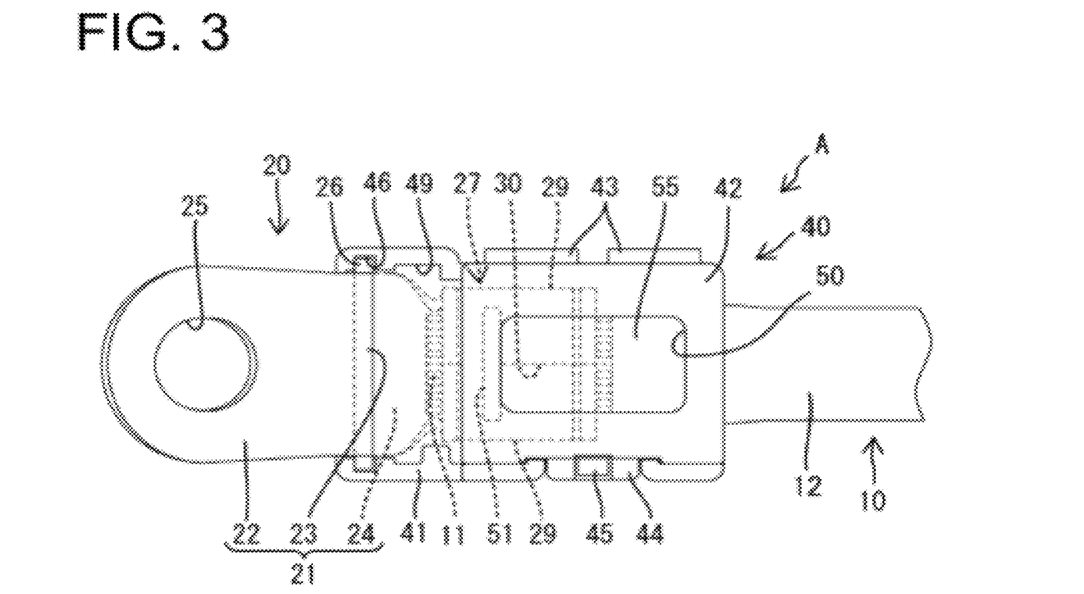
FIG. 3 is a plan view of the first embodiment.
Figure 4:
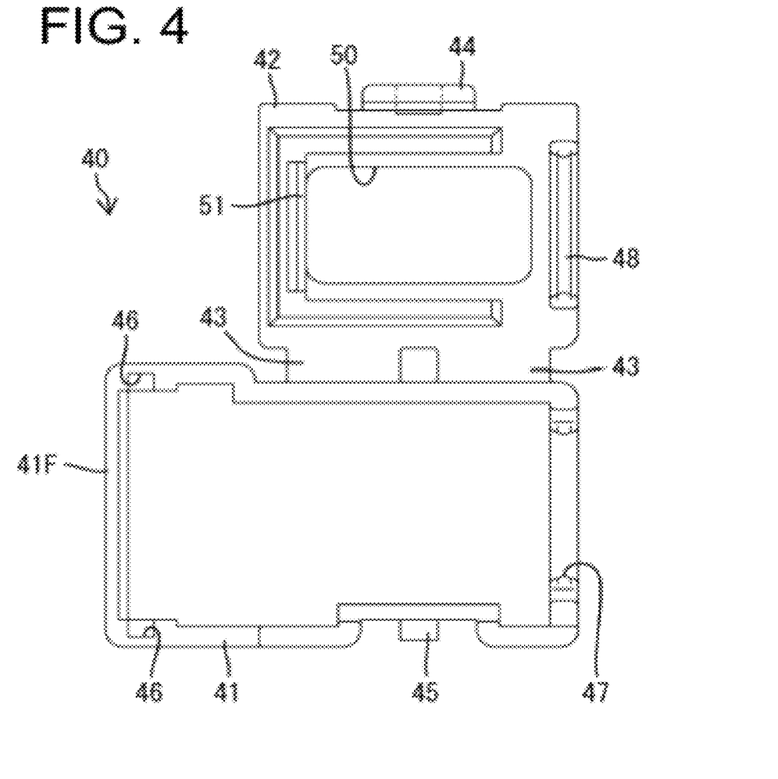
FIG. 4 is a plan view of a waterproof cover with a lid located at an opening position.
Figure 5:
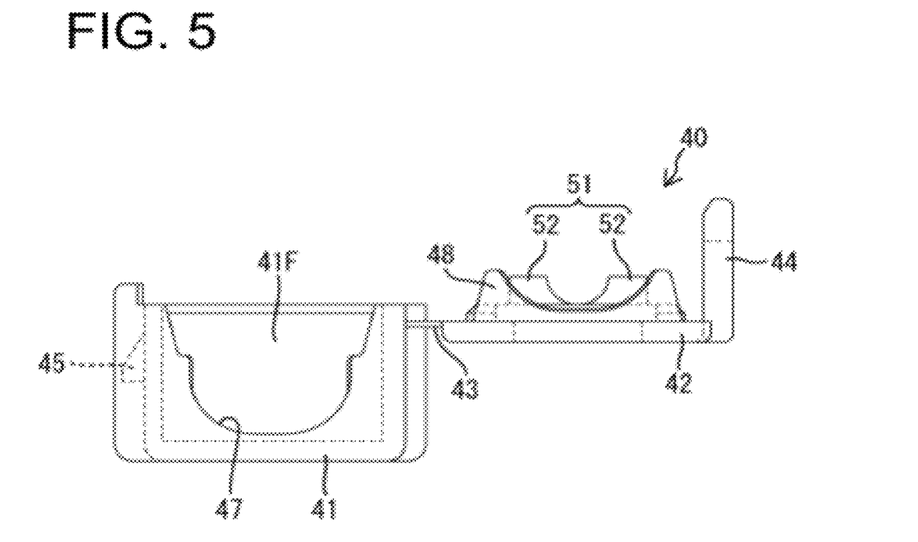
FIG. 5 is a rear view of the waterproof cover with the lid located at the opening position.
Figure 6:
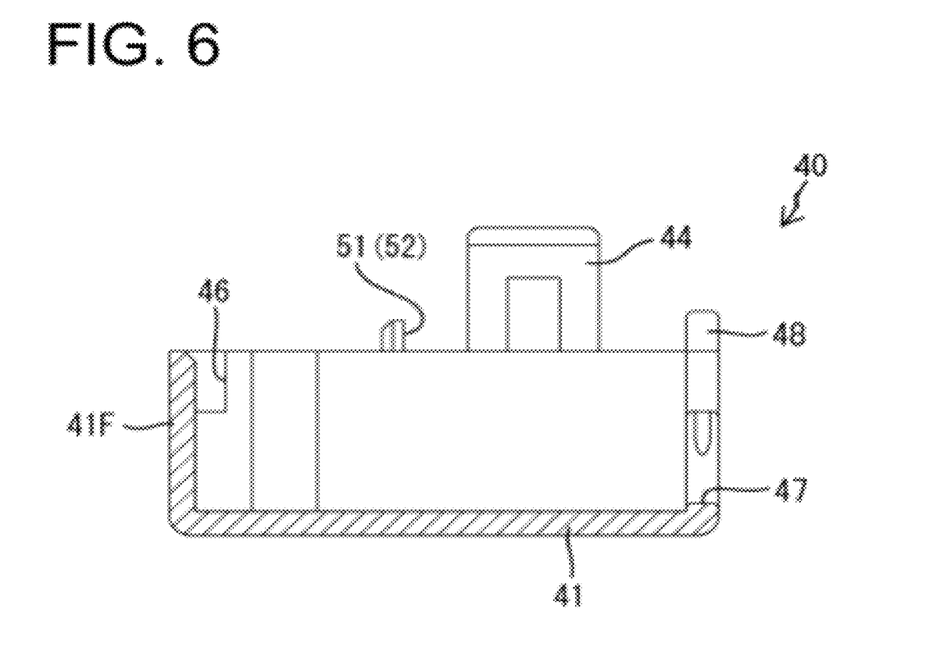
FIG. 6 is a longitudinal section of the main body with the lid located at the opening position.

A substantially rectangular injection opening 50 is made in the lid 42 while leaving front, rear, left and right edges. A holding portion 51 is formed unitarily at the front edge of the injection opening 50 and projects down and in when the lid 42 is at the closed position. As shown in FIG. 2, the holding portion 51 includes two substantially laterally symmetrical projections 52 spaced apart in the lateral direction. The projections 52 contact the upper end surfaces of the crimping pieces 29 from above when the lid 42 is at the closed position to prevent an upward displacement of the wire connecting portion 27. A space enclosed by the projections 52 and the upper surface of the wire connecting portion 27 including the valley 30 functions as a flow path for permitting the flow of the filling material 55 in forward and backward directions.

Figure 7:
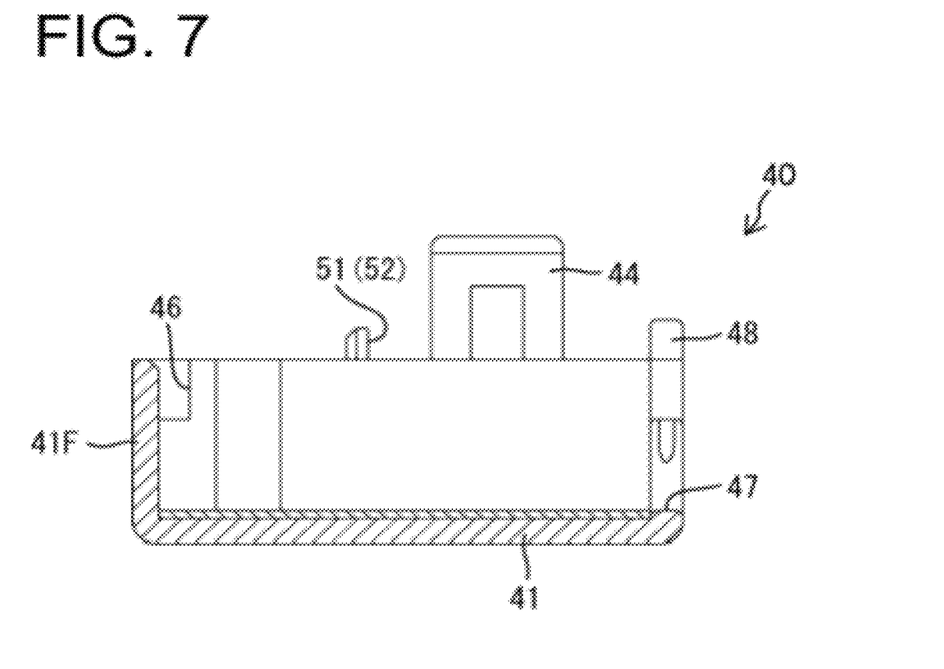
FIG. 7 is a longitudinal section of the main body showing a state where a part of the filling material is injected with the lid located at the opening position in a production process.

The waterproof device A is produced by initially connecting the conductor 11 with the wire connecting portion 27. On the other hand, the lid 42 of the waterproof cover 40 is kept on standby at or near the closed position and, in this state, only a tiny part of the total injection amount of the filling material 55 is injected to be positioned substantially on the bottom surface of the main body 41, as shown in FIG. 7.

Figure 8:
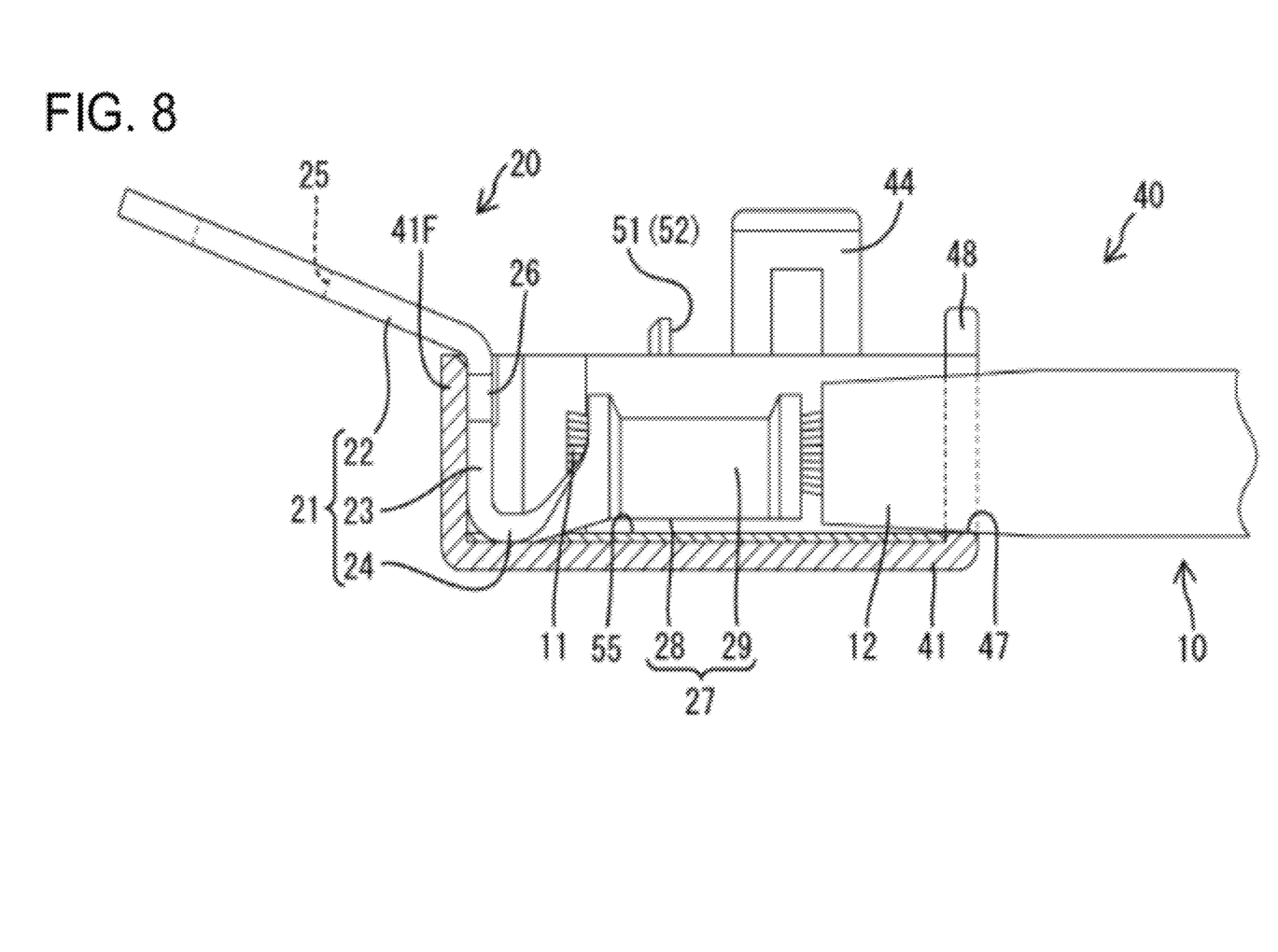
FIG. 8 is a longitudinal section of the main body showing a state where a conductor and a wire connecting portion are accommodated in the state of FIG. 7 in the production process.
Figure 9:
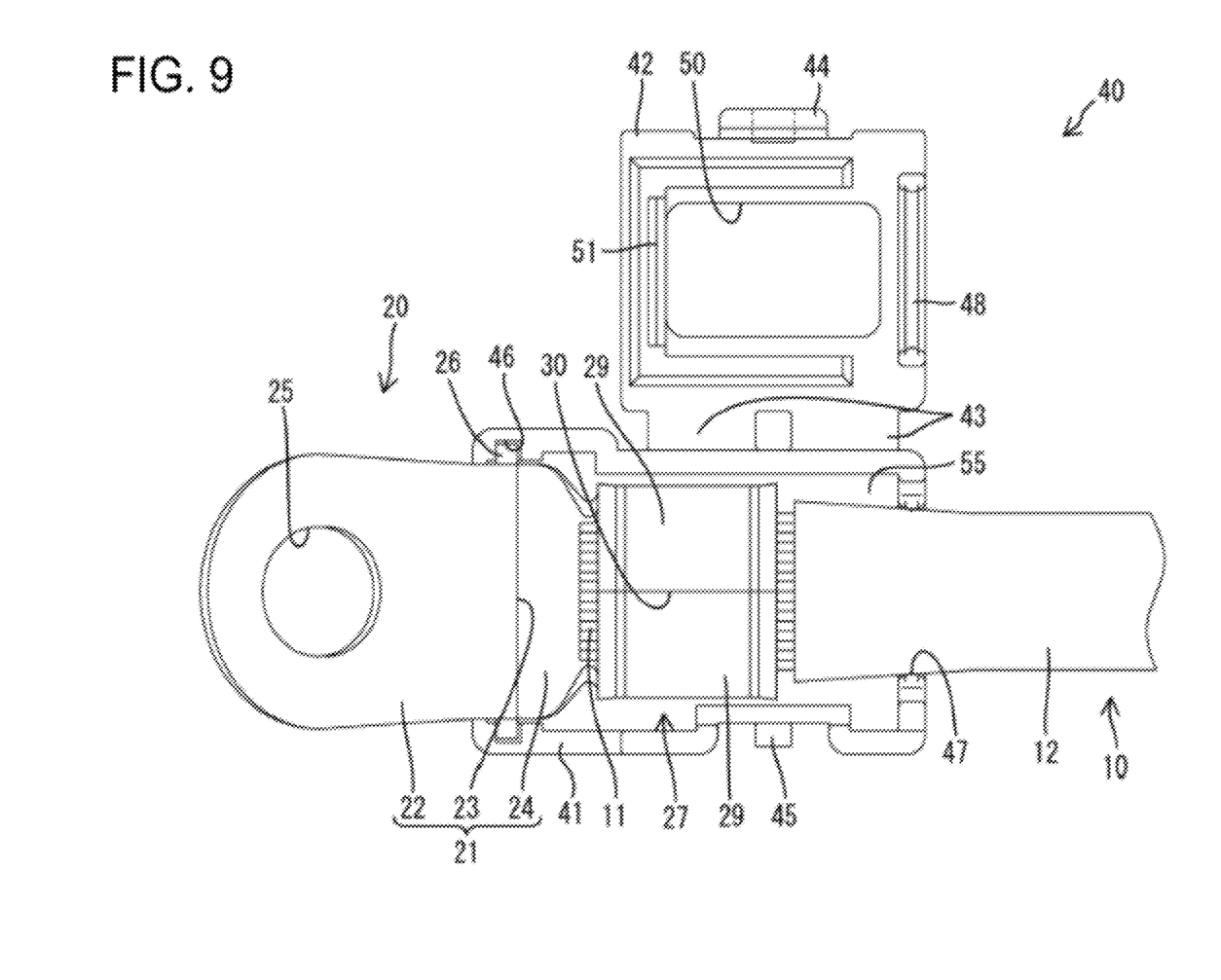
FIG. 9 is a plan view of the waterproof cover showing the state where the conductor and the wire connecting portion are accommodated in the state of FIG. 7 in the production process.

The connected conductor 11 and wire connecting portion 27, the positioning portion 23, the coupling 24 and the part of the wire 10 covered by the insulation coating 12 are accommodated in the main body 41, as shown in FIGS. 8 and 9. At this time, the locking projections 26 engage the locking grooves 46 and the positioning portion 23 contacts the front wall 41F and the opposite left and right walls of the main body 41 to position the terminal fitting 20 with respect to the main body 41. Further, the terminal fitting 20 is positioned vertically with respect to the main body 41 by placing the coupling 24 on the bottom surface of the main body 41. In this state, the filling material 55 laid on the bottom surface of the main body 41 and the wire connecting portion 27 are spaced vertically apart and the filling material 55 on the bottom surface and the lower surface of the insulation coating 12 also are spaced vertically apart. Further, clearances, into which the filling material 55 is to be injected, are formed between the left and right surfaces of the wire connecting portion 27 and the left and/right walls, between the coupling portion 24 and the lateral (left and/or right) wall(s) and/or between the insulation coating 12 and the lateral (left and/or right) wall(s).

Figure 10:
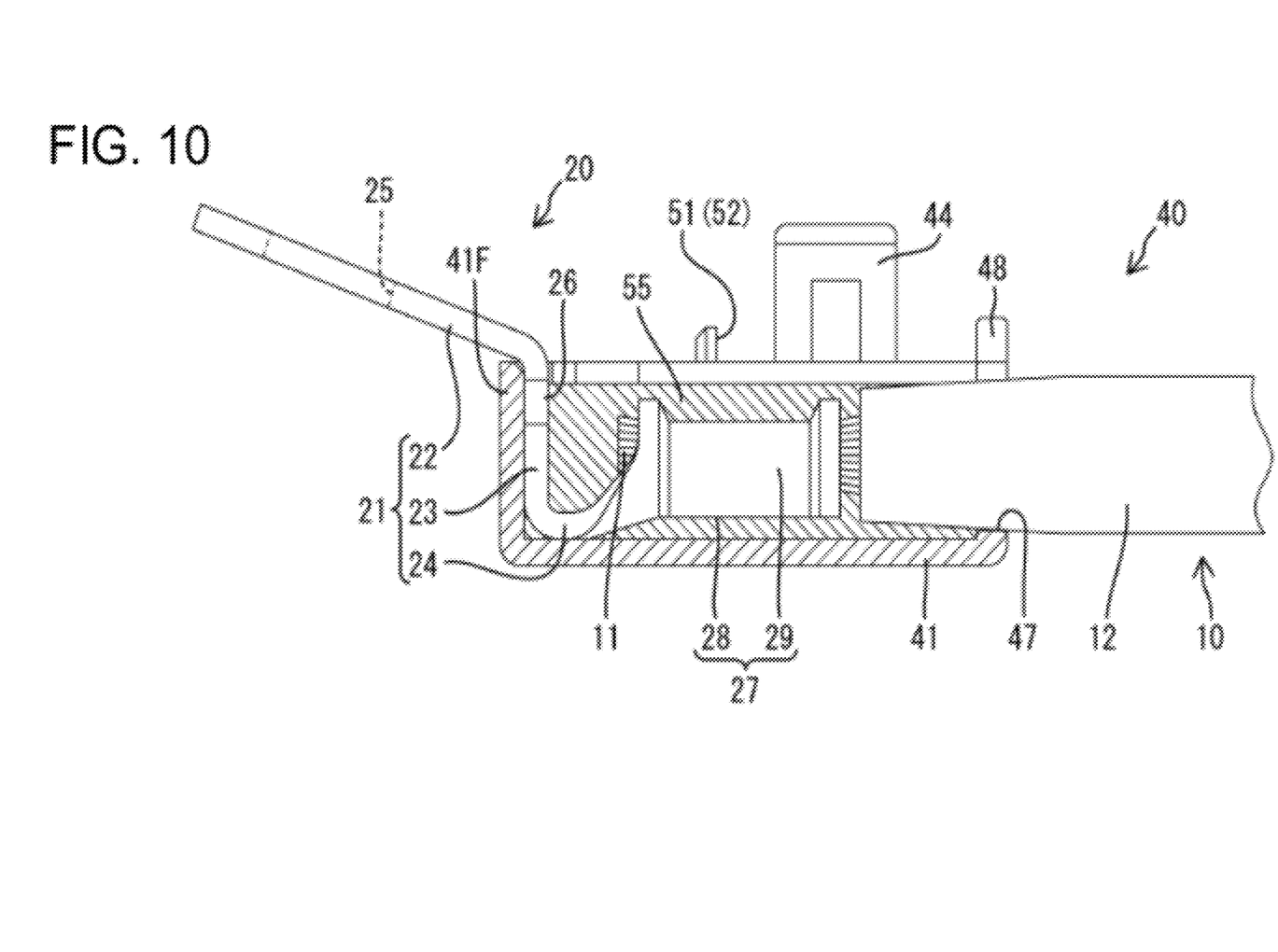
FIG. 10 is a longitudinal section of the main body showing a state where a part of the filling material is injected in the state of FIG. 8 in the production process.

Thereafter, a part of the total injection amount of the filling material 55 is injected into the main body 41 through the opening in the upper surface of the main body 41. At this time, the lid 42 is not present in the opening of the main body 41 and therefore a nozzle (not shown) for injecting the filling material 55 can be moved freely for evenly filling up the clearances between the terminal fitting 20, the wire 10 and the main body 41. The amount of the filling material 55 injected at this time is sufficient to bury all of the wire connecting portion 27, the conductor 11 and the coupling 24 as well as all of the positioning portion 23 except the upper end, as shown in FIG. 10. The level of the injected filling material 55 is slightly lower than the upper end of the main body 41.

Figure 11:
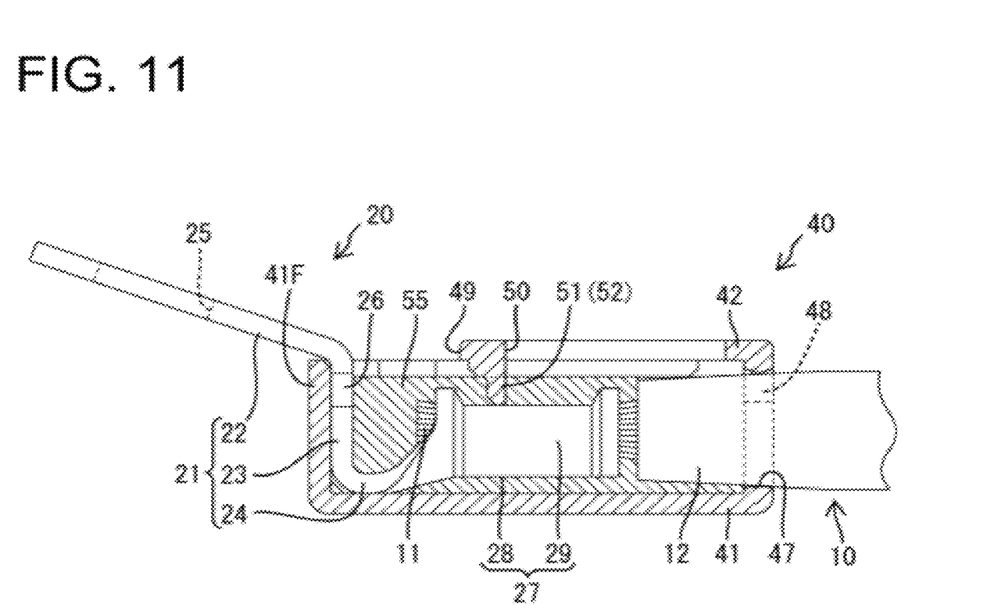
FIG. 11 is a longitudinal section of the main body showing a state where the lid is displaced to a closing position in the state of FIG. 10 in the production process.

The lid 42 then is displaced from the opening position towards or to the closing position, as shown in FIG. 11. In this state, the holding portion 51 penetrates the filling material 55 and contacts the upper end surfaces of the crimping pieces 29. Thus, the wire connecting portion 27 is pressed from above to prevent an upward displacement. The left and right projections 52 of the holding portion 51 press the wire connecting portion 27 at two laterally spaced-apart positions and prevent an inclination of the wire connecting portion 27 in the lateral direction.

The holding portion 51 divides the space between the terminal fitting 20 and the lid 42 into front and rear sections and the filling material 55 is filled in both divided sections. The flow path 53 extends in forward and backward directions preferably between the holding portion 51 and the wire connecting portion 27 and accommodates a free flow of the filling material 55 between the space before the holding portion 51 and that behind the holding portion 51.

Figure 1:
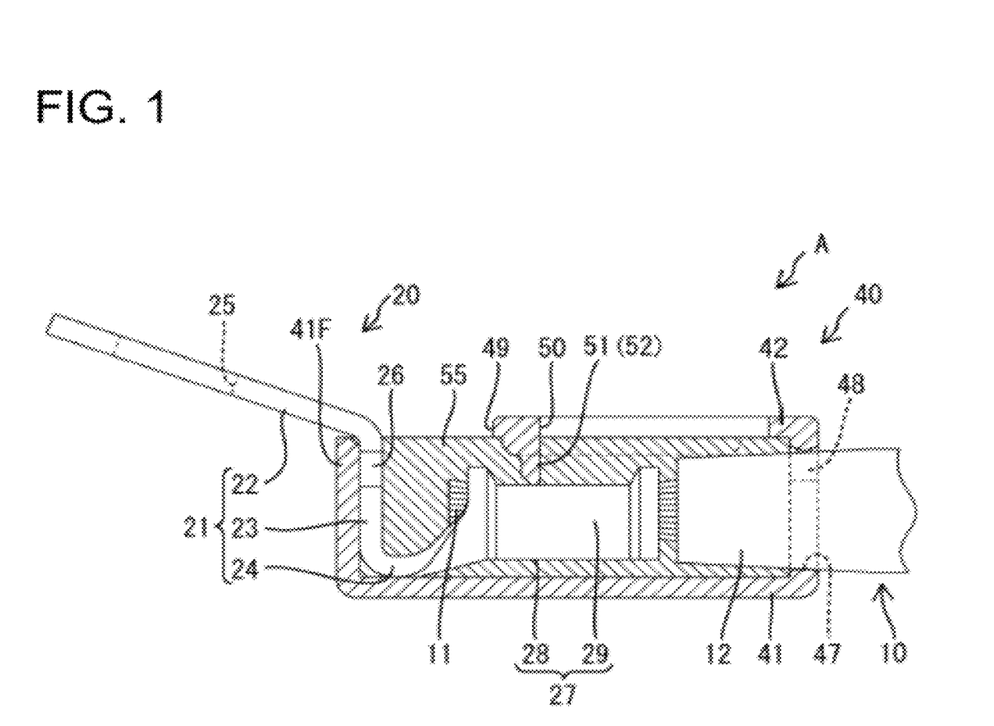
FIG. 1 is a longitudinal section of a first embodiment.

The remainder of the filling material 55 then is injected into the waterproof cover 40, as shown in FIG. 1. At this time, an area of the upper surface of the waterproof cover 40 before the holding portion 51 is open over the entire width of the main body 41 to define the confirmation opening 49 and an area of the upper surface of the waterproof cover 40 behind the holding portion 51 is open in a range narrower than the opening width of the main body 41 to define the injection opening 50. The filling material 55 can be injected through the confirmation opening 49 and/or the injection opening 50. The filling material 55 in the main body 41 moves forward or backward via the flow path 53 of the holding portion 51 so there is no difference in the fluid level of the filling material 55 at the opposite sides of the holding portion 51.

The waterproof cover 40 is heated to cure the filling material 55 after the specified amount of the filling material 55 is injected. Moisture that may be mixed in the filling material 55 vaporizes during the heating process and generates bubbles in the filling material 55. The bubbles expand as the heating proceeds. The bubble generation and expansion causes the filling material 55 to exert a pressing force on the terminal fitting 20. The acting position, direction and magnitude of this pressing force are unspecified and could cause the terminal fitting to incline or displace unpredictably.

However, the contact action of the positioning portion 23 and the locking action of the locking projections 26 with the locking grooves 46 prevent forward, backward, lateral and/or downward movements of the terminal fitting 20 of this embodiment relative to the waterproof cover 40. Further, the holding portion 51 contacts the wire connecting portion 27 from above to prevent an upward movement of the terminal fitting 20 relative to the waterproof cover 40. Thus, pressing forces generated by bubbles in the filling material 55 cannot change the position and posture of the terminal fitting 20 and, when the filling material 55 is cured, the terminal fitting 20 is held at a correct position and in a correct posture with respect to the waterproof cover 40.

The holding portion 51 projects in from the lid 42, which defines the upper wall of the waterproof cover 40. The confirmation opening 49 in the upper surface of the waterproof cover 40 is above the front end of the conductor 11 and forward of the wire connecting portion 27. The confirmation opening 49 enables visual confirmation of the state of the front end portion of the conductor 11 obliquely from the front-upper side. The holding portion 51 may hinder the visual confirmation through this confirmation opening 49. However, the confirmation opening 49 is arranged behind the holding portion 51. Thus, whether the front end of the conductor 11 is covered correctly by the filling material 55 can be detected visually through the confirmation opening 49.

Forces could be exerted on the terminal fitting 20 in directions that could cause the terminal fitting 20 to pivot about the holding portion 51. Such an inclination would displace and incline the positioning portion 23 with respect to the front wall 41F. An angle of inclination of the positioning portion 23 caused by such a pivoting would be larger as a distance between the front wall 41F and the holding portion 51 is shorter. Friction between the positioning portion 23 and the front wall 41F and friction between the locking projections 26 and the locking grooves 46 become larger as the positioning portion 23 inclines more and this friction suppresses displacement of the positioning portion 23 and the entire terminal fitting 20. More particularly, the holding portion 51 contacts the wire connecting portion 27 at the position close to the front end of the wire connecting portion 27 to maximally shorten the distance between the front wall 41F and the holding portion 51. Therefore, the inclination of the terminal fitting 20 is prevented more effectively.

The holding portion 51 is positioned for partially partitioning the space between the terminal fitting 20 and the waterproof cover 40, and hence the holding portion could hinder the flow of the filling material 55 injected into the waterproof cover 40. However, a part of the filling material 55 is injected into the main body 41 before the holding portion 51 is brought into contact with the terminal fitting 20. Therefore, the influence of the holding portion 51 on the flow of the filling material 55 is suppressed.

A part of the filling material 55 is injected onto the bottom surface of the main body 41 before the wire connecting portion 27 and the conductor 11 are accommodated into the main body 41. Thus, the filling material 55 is filled reliably between the bottom surface of the main body 41 and the lower surface of the wire connecting portion 27.

Figure 12:
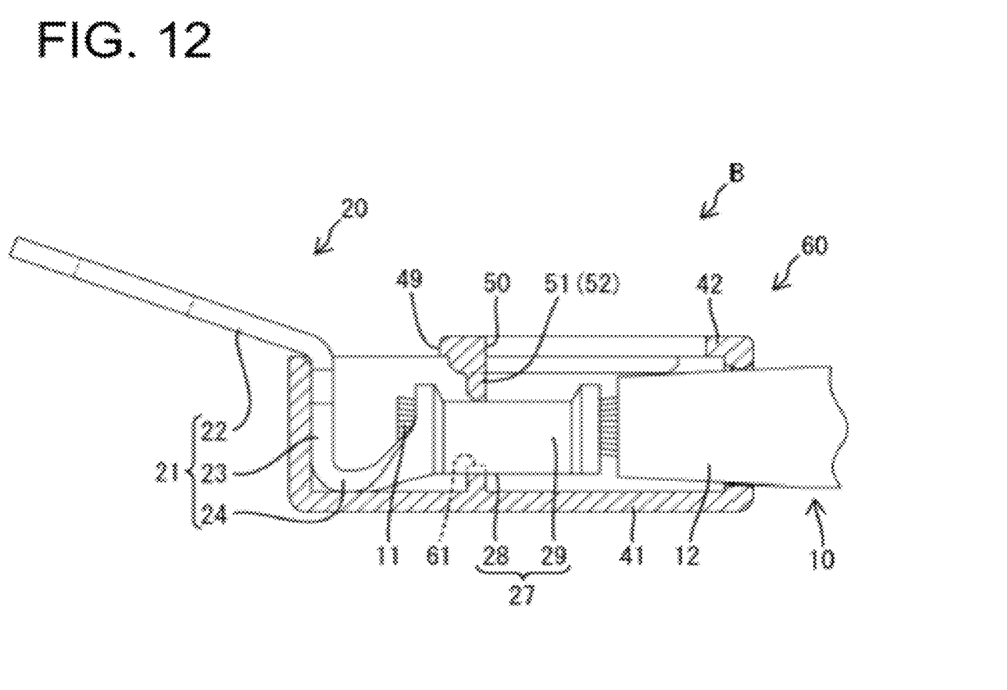
FIG. 12 is a longitudinal section of a waterproof cover without any graphical representation of a filling material in a second embodiment.
Figure 13:
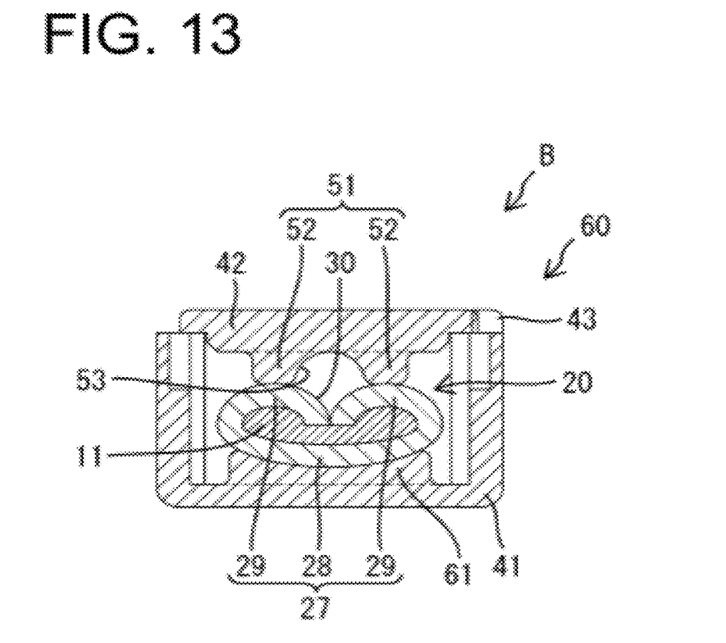
FIG. 13 is a lateral section of the waterproof cover without any graphical representation of a filling material in the second embodiment.

A second preferred embodiment of the invention is described with reference to FIGS. 12 and 13. A waterproof device B of the second embodiment differs from the first embodiment in that at least one receiving portion 61 is formed on or in the inner surface of the bottom wall of a main body 41 of a waterproof cover 60. The receiving portion 61 contacts the lower surface of the bottom plate 28 of the wire connecting portion 27 and cooperates with the holding portion 51 to sandwich the wire connecting portion 27 vertically. Hence, the wire connecting portion 27 reliably is positioned in the vertical direction. The upper surface of the receiving portion 61 is curved concavely to receive the wire connecting portion 27 so that the wire connecting portion 27 is difficult to displace laterally with respect to the receiving portion 61. Thus, the terminal fitting 20 also is positioned laterally with respect to the waterproof cover 60. The other elements are the same as or similar to the first embodiment. These elements are identified by the same reference numerals, but are not described.

Figure 14:
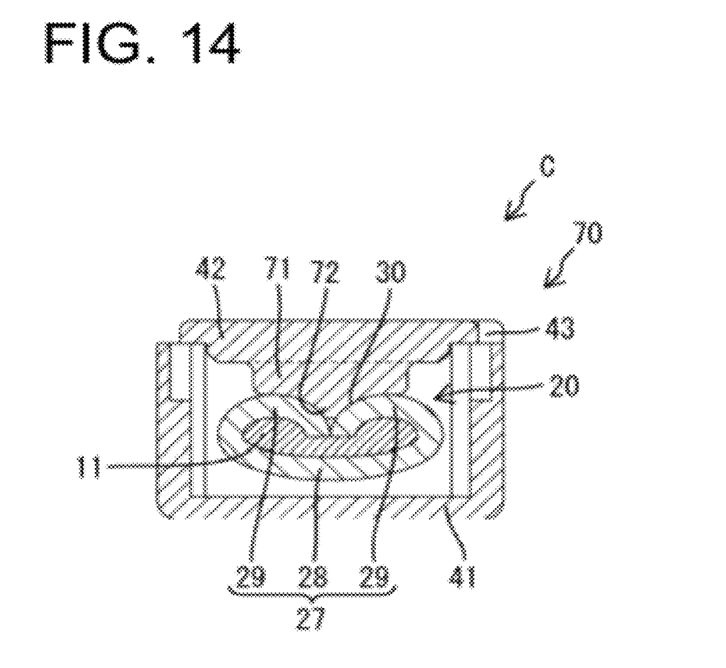
FIG. 14 is a lateral section of a waterproof cover without any graphical representation of a filling material in a third embodiment.

A third embodiment of the invention is described with reference to FIG. 14. A waterproof device C of the third embodiment differs from the first embodiment in the shape of a holding portion 71. A fitting 72 projects down and in from a lateral center position of the lower inner end edge of the holding portion 71. The fitting 72 fits into the valley 30 of the wire connecting portion 27 as the lid 42 is displaced to the closed position to prevent lateral displacement of the terminal fitting 20. The other elements are the same as or similar to the first embodiment. These elements are identified by the same reference numerals, but are not described again.

Figure 15:
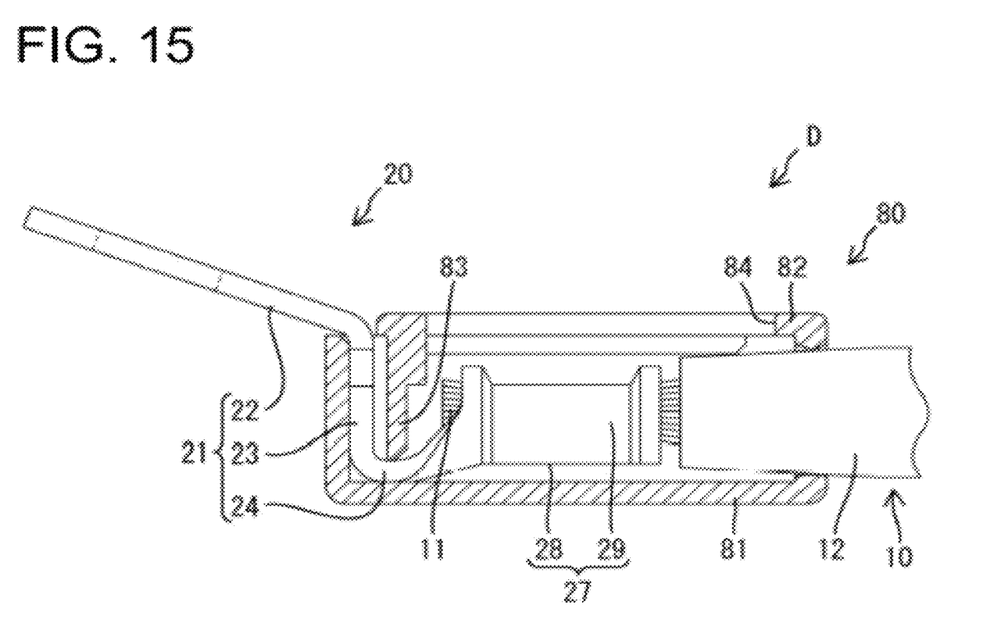
FIG. 15 is a longitudinal section of a waterproof cover without any graphical representation of a filling material in a fourth embodiment.

A fourth embodiment of the invention is described with reference to FIG. 15. A waterproof device D of the fourth embodiment differs from the first embodiment in the shapes of a lid 82 and a holding portion 83 of a waterproof cover 80. The lid 82 of the fourth embodiment covers substantially the entire area of an opening formed in the upper surface of a main body 81 except for a slit permitting the positioning portion 23 to project out from the main body 81. Accordingly, no opening equivalent to the confirmation opening 49 of the first embodiment is formed before the lid 82 for permitting the front end of the conductor 11 to be confirmed visually obliquely from the front when the lid 82 is displaced to a closed position. The lid 82 is formed with an injection opening 84 substantially corresponding to the wire connecting portion 27 and the front end of the conductor 11 in forward and backward directions. The filling material 55 can be injected through the injection opening 84 and the state of the conductor 11 can be confirmed visually from right above.

On the other hand, the holding portion 83 projects into the waterproof cover 80 from the front end edge of the lid 82. The front end edge of the lid 82 is slightly before the front end of the conductor 11. Thus, the holding portion 83 can be inserted into the space between the front end of the conductor 11 and the positioning portion 23 to contact the coupling 24 from above. Upward displacement of the terminal fitting 20 with respect to the waterproof cover 80 is prevented by pressing the coupling 24 from above. The other elements are the same as or similar to the first embodiment. These elements are identified by the same reference numerals, but are not described again.

The invention is not limited to the above described and illustrated embodiments. For example, the following embodiments are also included in the technical scope of the present invention.

The holding portion is laterally symmetrical in the first to fourth embodiments, but it may be laterally asymmetric.

The holding portion has two projections in the first and second embodiments, but it may include one, three or more projections.

The holding portion contacts the front end of the wire connecting portion in the first to third embodiments. However, the holding portion may contact a central position of the wire connecting portion in forward and backward directions or a rear end portion of the wire connecting portion.

The construction for sandwiching the wire connecting portion by the receiving portion and the holding portion in the second embodiment is also applicable to the first and third embodiments.

The construction for pressing a base end portion of the terminal portion by the holding portion in the fourth embodiment is also applicable to the first to third embodiments.

The holding portion projects from the surface with the confirmation opening in the above embodiments, but it may project from a different surface.

The holding portion projects from the lid formed with the injection opening for the filling material in the first to fourth embodiments. However, the holding portion may project from another wall.

Although only one holding portion is provided in the first to fourth embodiments, a plurality of holding portions may be provided.

Although the injection opening and the confirmation opening are formed in the same wall in the first to fourth embodiments, they may be formed in different walls.

A part of the filling material is injected before the lid is closed and, then, the remaining filling material is injected with the lid closed in the above embodiments. However, the filling material may be injected after the lid is closed without injecting any filling material before the lid is closed.

The lid is coupled unitarily to the main body by the hinge in the first to fourth embodiments. However, the lid and the main body may be separate parts according to the invention.

Although the injection opening is formed in the lid in the first to fourth embodiments, no injection opening may be formed in the lid.

What is claimed is:

1. A waterproof device for waterproofing connected parts of a wire and a terminal fitting, comprising:
a waterproof cover into which a wire connecting portion of the terminal fitting and a part of the wire are to be accommodated, the wire connecting portion being continuous with a terminal portion to be connected with a connection object, the waterproof cover having opposite front and rear ends spaced apart along forward and backward directions, a front wall being formed at the front end,
wherein clearances in the waterproof cover are at least partly filled with a filling material,
the waterproof cover is formed with at least one locking portion for engaging the terminal fitting and positioning the terminal fitting along the forward and backward directions and relative to the front wall and at least one holding portion for holding the terminal fitting in such a manner as to prevent a movement of the terminal fitting with respect to the waterproof cover by coming into contact with the terminal fitting in a direction substantially parallel to the front wall.

2. The waterproof device of claim 1, wherein the waterproof cover has a wall formed with at least one confirmation opening substantially corresponding to a front end portion of the wire projecting forward from the wire connecting portion.

3. The waterproof device of claim 2, wherein the holding portion projects from the wall of the waterproof cover that has the confirmation opening and is arranged behind the confirmation opening.

4. The waterproof device of claim 1, wherein:
the terminal portion comprises a positioning portion that contacts the front wall of the waterproof cover, wherein the front wall defines at least part of the locking portion for engaging the terminal portion of the terminal fitting and positioning the terminal fitting along the forward and backward directions and relative to the front wall.

5. The waterproof device of claim 1, wherein a contact position of the holding portion with the wire connecting portion is close to the front end of the wire connecting portion.

6. The waterproof device of claim 1, wherein an injection opening is formed in a wall of the waterproof cover for injecting the filling material into the waterproof cover and wherein the holding portion projects from the wall.

7. The waterproof device of claim 1, wherein:
the wire connecting portion has a base plate, two lateral crimping pieces standing up from the base plate and configured so that a conductor of the wire is at least partly surrounded by the base plate and the crimping pieces; and
the crimping pieces being curved inwardly and have standing end edges that bite in the conductor to define a valley extending substantially in forward and backward directions in the wire connecting portion.

8. The waterproof device of claim 1, wherein the holding portion includes a plurality of projections that contact the wire connecting portion at a plurality of laterally spaced-apart positions.

9. The waterproof device of claim 8, wherein a space enclosed by the plurality of projections and the outer surface of the wire connecting portion defines a flow path for permitting a flow of the filling material in substantially forward and backward directions.

10. The waterproof connector of claim 7, wherein the holding portion has at least one fitting that is fit into the valley.

11. The waterproof device of claim 1, wherein at least one receiving portion is formed on an inner surface of the waterproof cover to sandwich the wire connecting portion together with the holding portion.

12. A waterproof device, comprising:
a waterproof cover having a main body with a bottom wall, side walls and a front wall projecting up from the bottom wall and an open top, locking grooves formed in the side walls and extending from the open top toward the bottom wall;
a terminal fitting having opposite front and rear ends, a terminal portion at the front end and a wire connecting portion at the rear end, the wire connecting portion being connected with a core of a wire and being accommodated in the main body, the terminal fitting further having locking projections being engaged in the locking grooves for positioning the terminal fitting relative to the front wall;
a lid closing at least a portion of the open top of the main body, a holding portion projecting from the lid in a direction substantially parallel to the front wall and contacting the wire connecting portion for holding the wire connecting portion in fixed relationship to the bottom wall of the main body; and
a filling material in the main body and substantially surrounding the wire connecting portion.

13. The waterproof device of claim 12, wherein the lid is configured to define at least one confirmation opening substantially corresponding to a front end portion of the wire projecting forward from the wire connecting portion.

14. The waterproof device of claim 12, the terminal having has a positioning portion that contacts the front wall.

15. The waterproof device of claim 12, wherein the holding portion includes a plurality of projections that contact the wire connecting portion at a plurality of laterally spaced-apart positions.

16. A method for producing a waterproof device, comprising:
connecting a wire connecting portion of a terminal fitting with a conductor of a wire;
accommodating the connected conductor and wire connecting portion in a main body of a waterproof cover so that locking projections of the terminal fitting engage in locking grooves of the main body to limit movement of the terminal fitting relative to the main body in directions substantially parallel to the wire;
injecting a first part of the filling material into the main body;
mounting a lid in an opening of the main body to bring at least one holding portion of the lid into contact with the wire connecting portion of the terminal fitting in a direction substantially perpendicular to the wire in such a manner to prevent a movement of the terminal fitting with respect to the waterproof cover; and
injecting a second part of the filling material into the main body.

17. The method of claim 16, further comprising a step of injecting a part of the filling material onto the bottom surface of the main body before the connected conductor and wire connecting portion are accommodated into the main body.

18. The method of claim 16, further comprising detecting a filled state of the filling material through at least one confirmation opening formed in the waterproof cover.

19. The method of claim 18, further comprising positioning a positioning portion of the terminal portion into surface contact with a front wall of the waterproof cover, wherein the holding portion contacts a front end portion of the wire connecting portion in a direction substantially parallel to the front wall.

* * * * *